United States Patent [19]
Janniello et al.

[11] Patent Number: 5,537,238
[45] Date of Patent: Jul. 16, 1996

[54] METHOD AND APPARATUS FOR MAKING WAVELENGTH ADJUSTMENTS IN A WAVELENGTH DIVISION MULTIPLEX SYSTEM

[75] Inventors: Frank J. Janniello, Stamford, Conn.; Richard A. Neuner, Kingston, N.Y.

[73] Assignee: International Business Machines Corporation, Armonk, N.Y.

[21] Appl. No.: 427,374

[22] Filed: Apr. 24, 1995

[51] Int. Cl.$^6$ .................................................. H04B 10/08
[52] U.S. Cl. ..................... 359/110; 359/161; 371/20.1
[58] Field of Search ............................... 359/110, 115, 359/124, 127, 133, 161, 163; 371/20.1; 370/69.1; 455/67.1

[56] References Cited

U.S. PATENT DOCUMENTS

| | | | |
|---|---|---|---|
| 4,893,300 | 1/1990 | Carlin et al. | 359/162 |
| 5,224,183 | 6/1993 | Dugan | 359/161 |
| 5,225,922 | 7/1993 | Chraplyvy et al. | 359/124 |
| 5,276,543 | 1/1994 | Olshansky | 359/161 |

OTHER PUBLICATIONS

IBM patent application, "Optical Wavelength Division Multiplexor for High Speed, Protocol–Independent Serial Data Sources," Ser. No. 08/193,969, Filed Feb. 9, 1994.

*Primary Examiner*—Leo Boudreau
*Assistant Examiner*—Kinfe-Michael Negash
*Attorney, Agent, or Firm*—Douglas W. Cameron; Jenkens & Gilchrist

[57] ABSTRACT

Method and apparatus for making wavelength and power adjustments to a laser in a wavelength division multiplex system includes an extender card containing fiber optic transmission devices and path attenuators is inserted in the system in place of a card containing the laser to be adjusted. The extender card includes switches to put the laser under adjustment in known states for making power adjustments and wavelength adjustments without affecting system operation. After adjustments have been made, the extender card is removed and the laser card is reinstalled in the system.

6 Claims, 3 Drawing Sheets

METHOD AND APPARATUS FOR MAKING WAVELENGTH ADJUSTMENTS IN A WAVELENGTH DIVISION MULTIPLEX SYSTEM

BACKGROUND OF THE INVENTION

1. Field of the Invention

The present invention relates to information communication systems, and more particularly to information communication systems employing laser transmitters and receivers in a wavelength division multiplex system.

2. Prior Art

In a wavelength division multiplex/demultiplex fiber optic communications link, the wavelength of each laser must be adjusted to correspond with that of one of a number of multiplexor grating peaks without interrupting the multiplexor functioning of other lasers that are properly tuned, each to its own grating peak.

In the past, wavelength adjustment of lasers in a wavelength division multiplex system was accomplished by measuring the power output at the transmitting output of the link, disabling all but the laser to be adjusted and tuning it for maximum power output, thus disrupting the entire link.

It is important for efficient and nondisruptive operation of the WDM system that the wavelength of any laser in the system be adjusted without disrupting the entire communications link.

SUMMARY OF THE INVENTION

Therefore, it is an object of the present invention to nondisruptively adjust wavelength and power output of one of a number of lasers in a wavelength division multiplex (WDM) communications link without disrupting operation of other laser transmitters in the WDM system.

Accordingly, method and apparatus for making wavelength and power adjustments to a laser in a wavelength division multiplex system includes an extender card containing fiber optic transmission devices and path attenuators is inserted in the system in place of a card containing the laser to be adjusted. The extender card includes switches to put the laser under adjustment in known states for making power adjustments and wavelength adjustments without affecting system operation. After adjustments have been made, the extender card is removed and the laser card is reinstalled in the system.

It is an advantage of the present invention that wavelength and power of individual lasers, each mounted on a different card in a wavelength division multiplex system can be readily adjusted without system disruption.

It is another advantage of the present invention that power and wavelength of a laser can be readily adjusted while the system continues in operation.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

In a wavelength division multiplex system, it may be required to make adjustments to one component of the system while the remaining system components continue to operate without interruption. As an example, laser wavelength and power output of one laser in the system may be adjusted while other lasers in the system continue to transmit data. Adjustments of power output and wavelength of a laser must be made without disconnecting the common fiber link interconnecting elements of the system.

Figure 1:
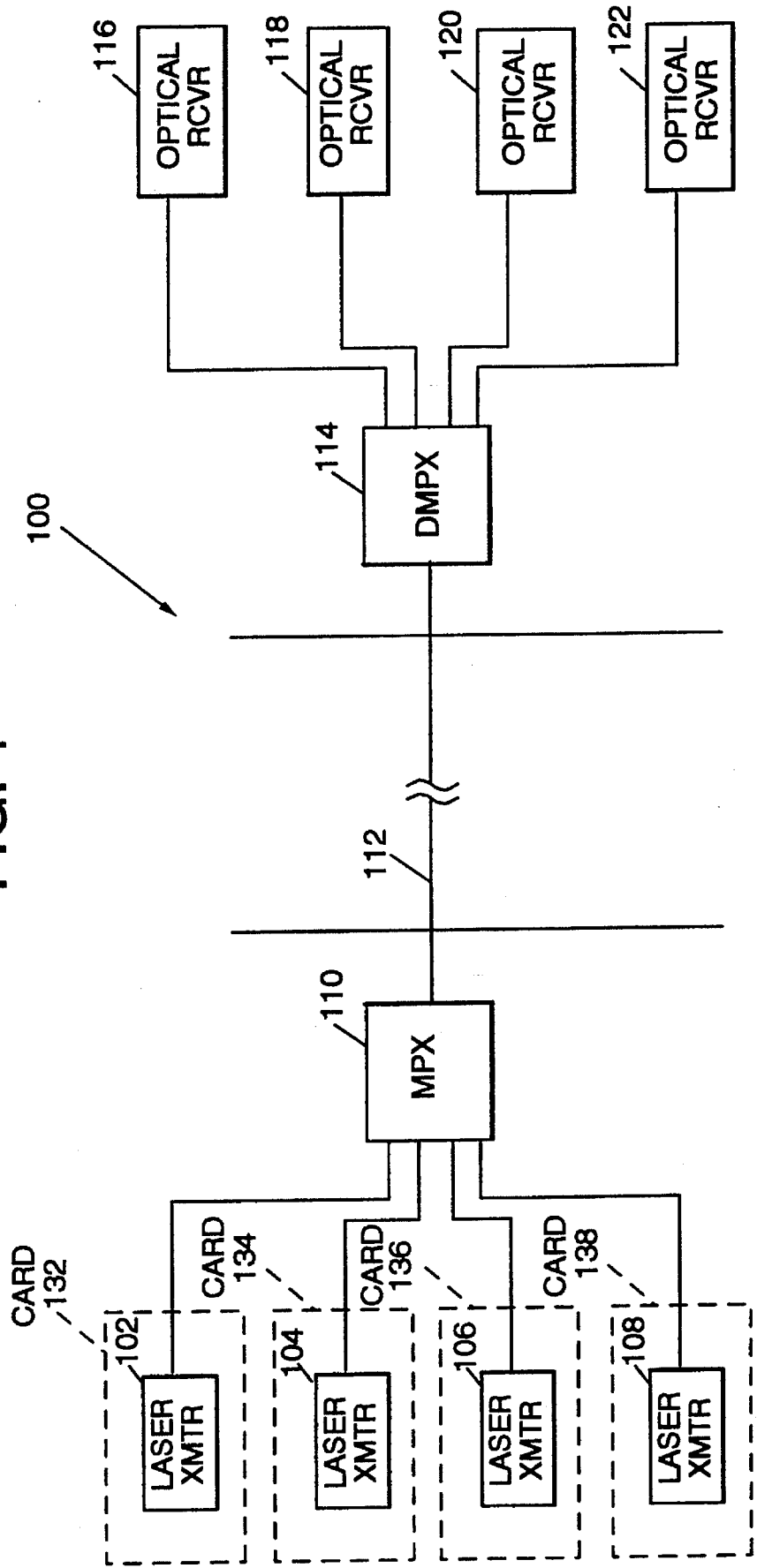
FIG. 1 is a block diagram of a wavelength division multiplex system in accordance with the present invention.

Referring now to FIG. 1, a wavelength division multiplex system (WDM) for transmitting information across a fiber optic link will be described.

Referring now to FIG. 1, WDM system 100 includes a number of laser transmitters 102, 104, 106 and 108, each connected by a separate fiber optic link to optical multiplexor 110 which multiplexes each of the transmitted optical signals to a single fiber optic link 112 using wavelength division multiplex techniques as are well-known in the art. Optical multiplexor 110 may be implemented by any one of several well-known WDM devices.

At the receiving end, the common fiber link 112 is connected to demultiplexer 114 which employs a wavelength division demultiplex on the signals present on common fiber link 112 and provides separate signals to optical receivers 116, 118, 120 and 122, respectively, depending on the wavelength of the received signals.

For efficient operation, and for ease of adjustment, each of the laser transmitters 102, 104, 106 and 108 are mounted on a separate card 132, 134, 136 and 138, respectively, installed in system 100.

Figure 2:
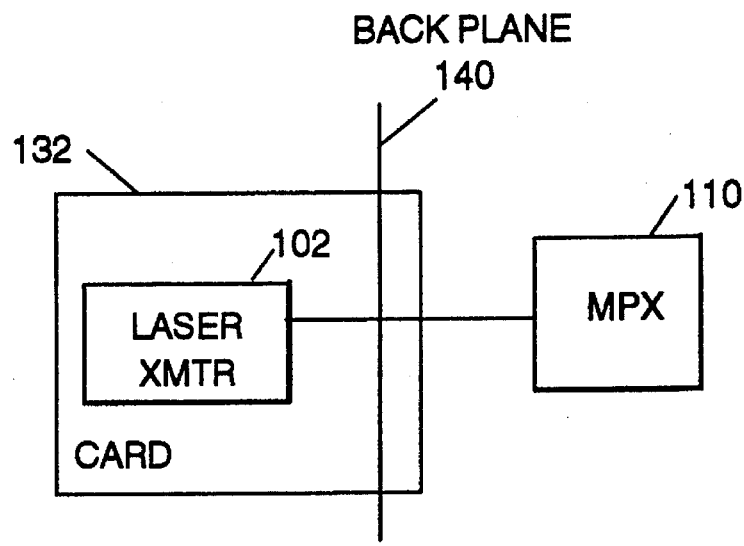
FIG. 2 is a schematic diagram of a card containing a laser connected to a multiplexer in accordance with the present invention.

Referring now to FIG. 2, the normal installation of card 132 in system 100 will be described.

Card 132 carrying laser transmitter 102 is installed in back plane 140 of system 100 and connected to multiplexor 110 during normal operation.

Figure 3:
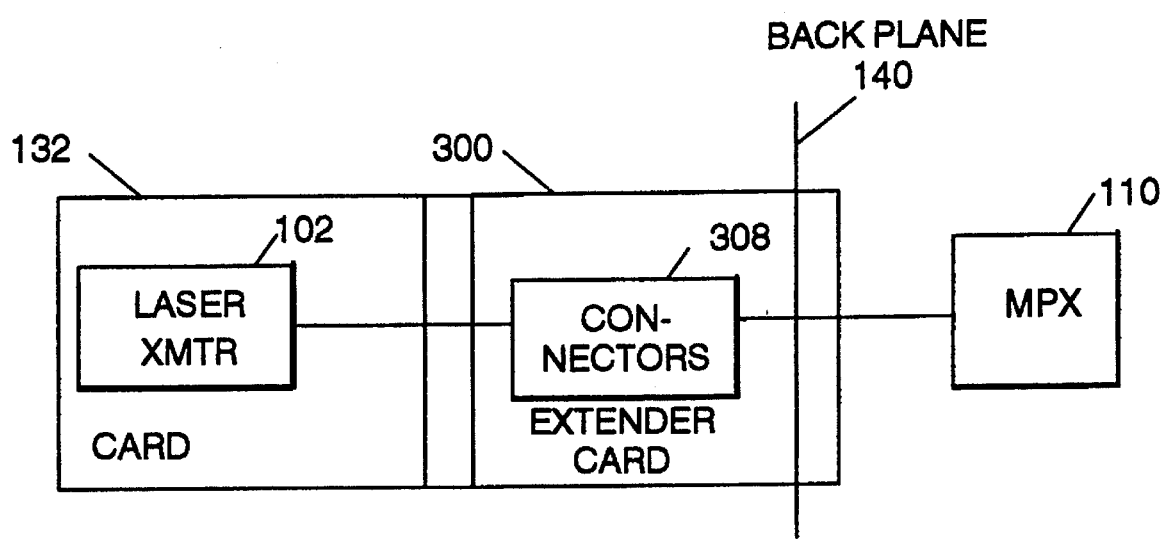
FIG. 3 is a schematic diagram of the card of FIG. 2 mounted on an extender card for adjusting power and wavelength of the laser contained on the card in accordance with the present invention.

Referring now to FIG. 3, a preferred embodiment of the present invention will be described in greater detail.

Card 132 on which laser transmitter 102 is mounted is removed from back plane 140 of system 100 and is mated with extender card 300 which is inserted in back plane 140 at the position from which card 132 was removed. Laser transmitter 102 then provides an output through connectors 308 on cards 300 to mutliplexor 110 as before.

However, with extender card 300 in place in the system, the power and wavelength of laser transmitter 102 can be adjusted without interruption of other laser transmitters 104, 106 and 108 in the information communication system 100.

Figure 4:
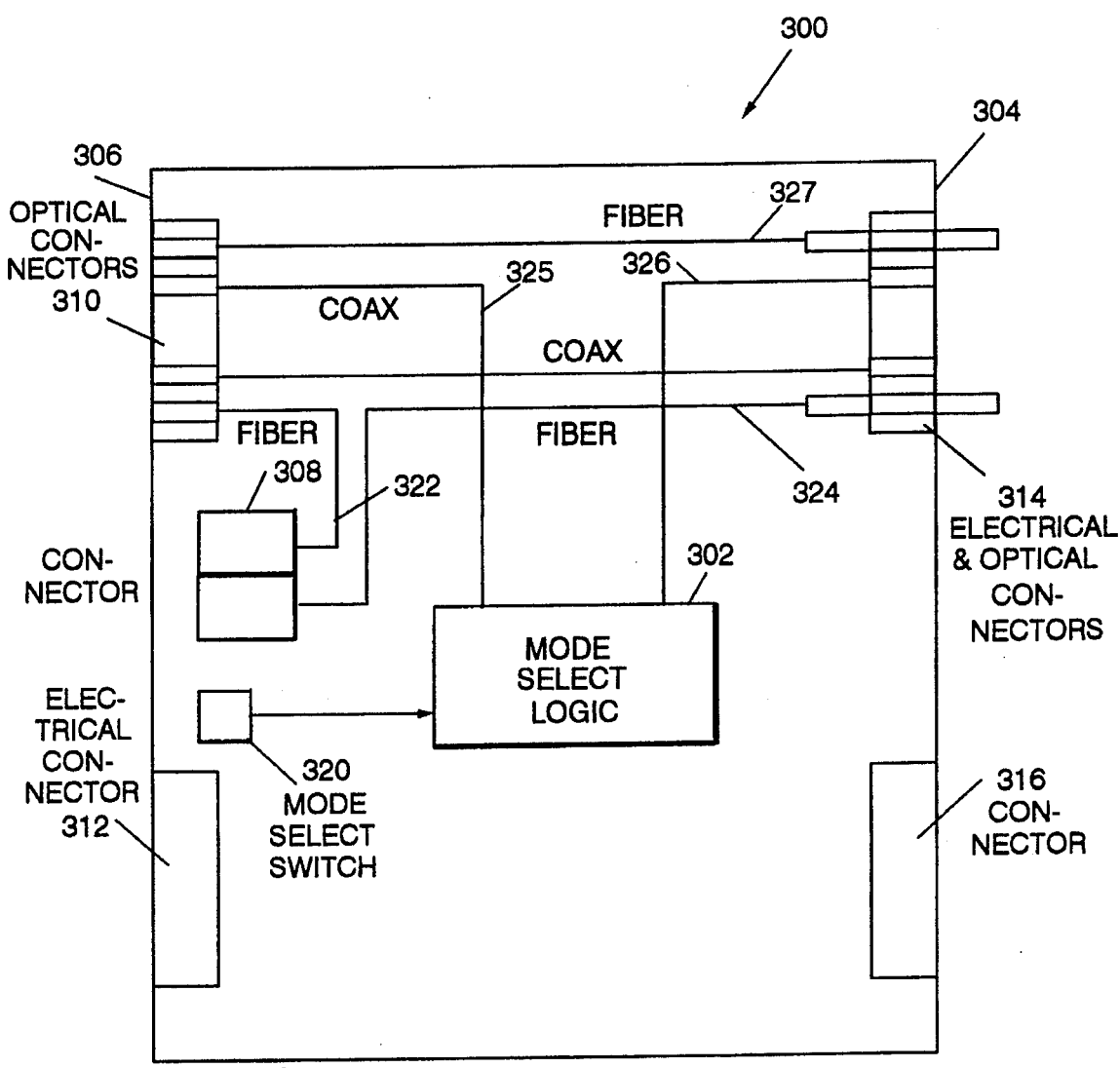
FIG. 4 is a schematic diagram of the extender card of FIG. 3 in accordance with the present invention.

Referring now to FIG. 4, extender card 300 will be described in greater detail.

A primary component of extender card 300 is control circuit 302 which includes mode select switch 320 for controlling the state of operation of laser transmitter 102 between an operational state and a test state. Connectors 308 are used for inserting an optical attenuator which provides an adjustable attenuation in the optical path between laser transmitter 102 and multiplexor 110. Laser transmitter card 132 is mated with extender card along edge 306 which includes electrical connectors 312, electrical and optical connectors 310, and fiber optic connectors 308. Extender card 300 is connected to back plane 140 along edge 304. Edge 304 includes connectors 314 which carries both electrical and optical signals and connector 316. A second set of optical connectors (not shown) may also be inserted in the path of fiber link 327 for test purposes.

The optical output from laser transmitter 102 is connected through connector 310 on extender card 300 to fiber link 322 to connector 308 which connects to an external variable attenuator. The output of the variable attenuator is connected on fiber link 324 to connector 314 which transmits the attenuated optical signal to multiplexor 110. Mode select logic 302 allows a laser transmitter 102 to be controlled by coax line 325 in response to control signals received by mode select logic 302 from backplane 140 on coax lines 326. Alternatively, the laser transmitter 102 can be controlled by logic 1 or 0 levels generated by mode select logic 302.

The mode selection as between normal and test operation is controlled by mode select switch 320 on extender card 30(i. Mode select switch 320 also includes a second switch which controls the binary levels of mode select logic 302 when in the test mode.

Using feedback from the open fiber detection circuitry of the optical link, the wavelength of laser transmitter 102 is adjusted to optimum.

The optical attenuator connected to connector 308 is adjusted until overall optical path loss is just sufficient for the optical receiver at the other end of the optical link to signal by a reverse channel that it has detected the light transmitted. The center of the range over which the returned signal indicates adequate received light is a proper adjustment for the laser transmitter 102.

After power and wavelength adjustments have been made for laser transmitter 102, extender card 300 is removed from back plane 140 and laser transmitter card 132 is reinstalled in back plane 140 as in FIG. 2 and normal operation is continued without disruption of other elements of the system.

Although the present invention and its advantages have been described in detail, it should be understood that various changes, substitutions and alterations can be made herein without departing from the spirit and scope of the invention as defined by the appended claims.

What is claimed is:

1. Apparatus for adjusting characteristics of a laser transmitter in a nondisruptive manner in a wavelength division multiplex optical information transmission system, comprising:

a plurality of transmitters, each operating at a different predetermined wavelength;

a multiplexor connected to said plurality of transmitters for multiplexing outputs of each of said transmitters to a common link employing a predetermined multiplexing technique;

a transmission link connecting said multiplexor to a demultiplexor for transmitting information;

said demultiplexor connected to said transmission line for demultiplexing signals transmitted over said transmission link employing a predetermined demultiplexing technique;

a plurality of detectors, each having one of a plurality of predetermined detection characteristics for recovering information transmitted from said multiplexor to said demultiplexor; and an adjustment means temporarily interposed between one of said transmitters and said multiplexor for adjusting characteristics of said transmitter without interrupting a multiplexer outputs of other transmitters such that, after said characteristics of said one of said transmitters have been adjusted, said adjustment means may be removed from between said one of said transmitters and said multiplexor.

2. Apparatus according to claim 1 wherein each of said plurality of transmitters is a laser transmitter, and each of said plurality of detectors is an optical detector and said transmission link is a fiber optic transmission link.

3. Apparatus according to claim 1 wherein said multiplexor is an optical multiplexor and said predetermined multiplexing technique is a wavelength division multiplex technique.

4. Apparatus according to claim 3 wherein said predetermined demultiplexing technique is a wavelength division demultiplexing technique.

5. Apparatus according to claim 1 wherein said adjustment means further comprises:

means for controlling a mode of operation of one of said plurality of transmitters; and means for controlling path attenuation between said one transmitter and said demultiplexor for facilitating power output and wavelength output of said one transmitter.

6. Apparatus according to claim 5 wherein said adjustment means is mounted on an extender device interposed between said one transmitter and said multiplexor.

* * * * *